United States Patent Office 3,413,329
Patented Nov. 26, 1968

3,413,329
CHLOROMETHYLATED ARALKYL SILANES AND SILOXANES
Enrico J. Pepe, Kenmore, and Bernard Kanner, Williamsville, N.Y., assignors to Union Carbide Corporation, a corporation of New York
No Drawing. Filed Dec. 31, 1964, Ser. No. 422,495
30 Claims. (Cl. 260—448.2)

ABSTRACT OF THE DISCLOSURE

Silanes of the formula

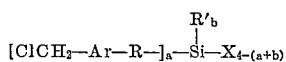

wherein Ar is an arylene radical; R is an alkylene radical; R' is a monovalent hydrocarbon radical; X is halogen or OR' where R' is as defined above, $a$ is 1 to 3; $b$ is 0 to 2; provided that the sum of $(a+b)$ does not exceed 3, except when X is chlorine in which case it does not exceed 2; as well as, siloxanes comprising (1) 5 to 95 mole percent of units of the formula

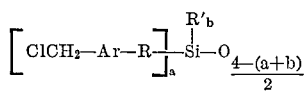

wherein Ar, R, R', $a$, $b$ and $(a+b)$ are the same as defined above, and (2) 5 to 95 mole percent of units of the formula

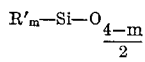

wherein $m$ is 1 to 3 and R' is the same as above defined; as well as a process for producing the above silanes by chloromethylation of the corresponding aralkylsilanes with chloromethyl methyl ether and thionyl chloride. The siloxanes find utility as lubricants, hydraulic fluids, and elastomers.

---

This invention relates to novel chloromethylarylsilanes and chloromethylaralkylsilanes, and to processes for their production.

Attempts have been made to chloromethylate phenylalkylchlorosilanes and phenylalkylalkoxysilanes using (1) an aqueous formaldehyde-HCl solution and, (2) chloromethyl methyl ether with zinc chloride, as the chloromethylating agents. In both cases, however, only polymeric siloxanes resulted and no monomeric chloromethylated silanes could be recovered.

While monomeric silanes containing no siliconfunctional groups have been chloromethylated using aqueous formaldehyde and zinc chloride in various solvents to effect chloromethylation, these products cannot be hydrolyzed and condensed to prepare polysiloxanes.

Attempts have also been made to prepare (chloromethylbenzyl)methyldimethylchlorosilane from benzylmethyldimethylchlorosilane employing aqueous formaldehyde or paraformaldehyde and fuming hydrochloric acid in the absence of zinc chloride to effect chloromethylation. In this process, however, the chloromethylated silane monomer is not produced directly and can only be recovered in rather low yield by treating the chloromethylated disiloxane which is produced by the reaction with sulfuric acid and ammonium chloride.

It is therefore an object of the instant invention to provide chloromethylated silanes having a halogen atom other than chlorine, e.g. fluorine, attached to the silicon atom of the silane.

It is a further object of the instant invention to provide chloromethylated silanes having more than one halogen atom attached to the silicon atom of the silane.

It is a still further object of the instant invention to provide choromethylated silanes having hydrolzable groups other than halogen attached to the silicon atom of the silane.

Another object of the instant invention is to provide processes for the direct preparation of chloromethylarylsilanes and chloromethylaralkylsilanes which do not require the prior preparation of siloxanes.

These and further objects of the instant invention will be apparent to those skilled in the art from the following specification.

The novel chloromethylated silanes prepared in accordance with the instant invention can be represented by the formula 1) 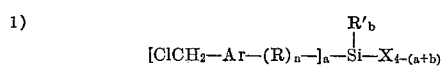

wherein Ar is an arylene radical, R is an alkylene radical, R' is a monovalent hydrocarbon radical, X is a halogen radical, preferably fluorine or chlorine, or OR" wherein R" is an alkyl radical, $n$ is an integer having a value of from 0 to 1, $a$ is an integer having a value of from 1 to 3, and $b$ is an integer having a value of from 0 to 2, provided, however, that the sum of $a+b$ does not exceed 3, except when X is chlorine, in which case it does not exceed 2. Preferably, $a$ has a value of 1 and the sum of $a+b$ does not exceed 2 regardless of whether X is chlorine or not, as silanes having only a single hydrolyzable group attached to silicon are not useful in the preparation of polysiloxanes except as end-blocking units.

The arylene radicals represented by Ar in Formula 1 above can be either monocyclic, bicyclic, or a fused ring, and can be unsubstituted or substituted with substituents which are inert under the reaction conditions employed in the invention. Usually such radicals have from 6 to about 18 carbon atoms. Illustrative of such radicals are o-phenylene, m-phenylene, p-phenylene, tolylene, xylylene, chlorophenylene, nitrophenylene, t-butylphenylene, naphthylene, anthrylene, methylnaphthylene, diphenylene, and the like. Preferably Ar represents a phenylene radical, most preferably p-phenylene.

The alkylene radicals represented by R in Formula 1 above can be either straight or branched chain radicals, and can be unsubstituted or substituted with substituents which are inert under the reaction conditions employed in the invention. Usually such radicals have from 1 to about 12 carbon atoms, preferably from 1 to about 8 carbon atoms. Illustrative of such radicals are methylene, ethylene, propylene, butylene, pentylene, 2-ethylhexylene, and the like.

The monovalent hydrocarbon radicals represented by R' in Formula 1 above usually contain from 1 to about 18 carbon atoms, and can be unsubstituted or substituted with substituents which are inert under the reaction conditions employed in the invention. Such radicals include straight and branched chain alkyl radicals such as methyl, ethyl, n-propyl, isopropyl, n-butyl, isobutyl, n-pentyl, n-hexyl, 2-ethylhexyl, n-decyl, n-dodecyl, and the like; alkenyl radicals such as vinyl, allyl, and the like; cycloaliphatic radicals such as cyclopentyl, cyclohexyl, and the like; aryl radicals such as phenyl, nitrophenyl, chlorophenyl, naphthyl, p-phenylphenyl, and the like; aralkyl radicals such as benzyl, β-phenylethyl, and the like; and alkaryl radicals such as p-methylphenyl, p-cyclohexylphenyl, α-methylnaphthyl, and the like. Preferably R' is an alkyl radical containing from 1 to about 8 carbon atoms.

The alkyl radicals represented by R" when X is OR" in Formula 1 above can be either straight or branched chain radicals, and can be unsubstituted or substituted with substituents which are inert under the reaction conditions employed in the invention. Usually such radicals have from 1 to about 18 carbon atoms, preferably from 1 to about 8 carbon atoms. Illustrative of such radicals are methyl, ethyl, n-propyl, isopropyl, n-butyl, isobutyl, n-pentyl, benzyl, 2-ethylhexyl, n-decyl, n-dodecyl, and the like.

Chloromethylarylsilanes and chloromethylaralkylsilanes are produced according to the instant invention by the chloromethylation of silanes represented by the formula (2) 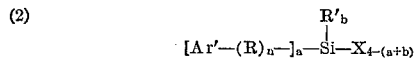

wherein R, $R_2$, and X are as above defined, Ar' is a monovalent aryl radical corresponding to arylene radical Ar as defined above except that one of the valencies of the arylene radical is satisfied by hydrogen, $n$ is an integer having a value of from 0 to 1, $a$ is an integer having a value of from 1 to 3, and $b$ is an integer having a value of from 0 to 2, provided, however, that the sum of $a+b$ does not exceed 3.

Chloromethylation according to the instant invention can be effected by reacting a silane of Formula 2 above with chloromethyl methyl ether and thionyl chloride, optionally in the presence of a catalytic amount of zinc chloride ($ZnCl_2$). The proportions of ingredients employed in the reaction mixture is not narrowly critical and can vary over a wide range. Suitable results can be obtained by employing from about 1 mole to about 6 moles, preferably from about 3 moles to about 5 moles, of chloromethyl methyl ether, and from about 1 mole to about 5 moles, preferably from about 2 moles to about 4 moles, of thionyl chloride, per stoichiometric equivalent of aryl or aralkyl group $[Ar'-(R)_n]$ of the silane to be chloromethylated. When zinc chloride is employed as catalyst, up to about 0.3 mole, preferably from about 0.01 mole to about 0.05 mole, of zinc chloride per stoichiometric equivalent of aryl or aralkyl group of the silane to be chloromethylated is suitable.

While the presence of thionyl chloride in the reaction mixture is usually necessary in order to prevent the chloromethylated silane formed from being converted to a polysiloxane, it has been found that the use of thionyl chloride is unnecessary when X is fluorine in Formula 2 above. In such instance, the same amounts of chloromethyl methyl ether and zinc chloride catalyst specified above can be employed to effect chloromethylation, but no thionyl chloride is necessary.

The temperature employed in effecting reaction according to the instant invention is not narrowly critical and can vary over a wide range. Generally, temperatures of from about 35° C. to about 120° C., preferably from about 60° C. to about 80° C., are suitable.

Atmospheric pressure is usually employed in effecting reaction as a matter of convenience. However, if desired, subatmospheric or superatmospheric pressures can also be employed.

Reaction according to the instant invention can be carried out in bulk, or in an inert liquid solvent or diluent. By "inert" is meant nonreactive under the reaction conditions employed. Among the inert liquid solvents which can be employed are n-hexane, benzene, toluene, xylene, n-heptane, dioxane, and the like.

Reaction according to the instant invention is most preferably carried out by admixing the silane to be chloromethylated with chloromethyl methyl ether and zinc chloride, and thionyl chloride when the silane employed is other than a fluorosilane, and gently refluxing the mixture with vigorous stirring for a period of from about 3 to about 5 hours. The chloromethylated silane produced by this procedure can be recovered from the reaction mixture by decanting the light product-containing layer formed from the denser zinc chloride-containing layer, filtering the decanted layer through milled sodium chloride to remove any dissolved zinc chloride, and finally distilling the filtrate to recover the desired chloromethylated silane.

When X is a halogen other than fluorine in Formula 1 above, it is possible to readily replace such halogen with OR' groups, wherein R' is a monovalent hydrocarbon radical as defined above with reference to Formula 1. Replacement of halogen with OR' groups can be effected by conventional methods by reacting the silane with a compound of the formula (3) 

wherein R' is a monovalent hydrocarbon radical as defined above with reference to Formula 1. The compounds produced by this procedure can be represented by Formula 1 above wherein X represents an OR' group, wherein R' is as above defined.

Although the reaction wherein the halogen atoms are replaced with OR' groups is spontaneous and proceeds without benefit of a catalyst even at room temperature, a small amount of an acid acceptor such as triethylamine can be employed to effect the removal of the last traces of halogen.

Likewise, when X is a halogen other than fluorine in Formula 1 above, it is possible to readily replace such halogen with acyloxy groups by reacting the silane with an anhydride in the conventional manner. Reaction is effected by simply contacting the silane with an anhydride, such as acetic anhydride. The reaction is spontaneous and proceeds to completion at elevated temperatures.

While the proportions of reactants employed in the halogen replacement reactions described is not narrowly critical and can vary over a wide range, it is preferred to use at least a stoichiometric quantity of R'—OH or anhydride per silicon bonded halogen atom to be replaced. Preferably, a 10 mole percent to 20 mole percent excess of R'—OH or anhydride is employed.

While silanes having silicon bonded halogen atoms other than fluorine can be readily reacted as described above, silanes having silicon bonded fluorine atoms do not undergo such reactions to any appreciable degree. However, the replacement of silicon-bonded fluorine atoms with OR' groups, wherein R' is as above defined, can be accomplished by the catalyzed redistribution of silicon-fluorine and silicon-hydrocarbyloxy bonds as described in copending application Ser. No. 313,442, filed Oct. 3, 1963, now U.S. Patent 3,374,247, which disclosure is incorporated herein by reference.

In accordance with the redistribution technique, a fluorosilane is heated in contact with a silicon compound containing at least one, and preferably at least three, hydrocarbyloxy groups directly attached to silicon, and with a redistribution catalyst such as tetrabutyltitanate, aluminum trichloride, tin dichloride, zirconium tetraethoxide, and the like. While both siloxanes and silanes having the requisite hydrocarbyloxy-silicon bonds can be employed, silanes such as methyltriethoxysilane, phenyltributoxysilane, tetramethylsilicate, and the like are preferred. The hydrocarbyloxy-containing silane should not, of course, have any groups present which are reactive with the chloromethylaryl or chloromethylaralkyl groups of the fluorosilane.

The redistribution process can be used to replace all or only some of the silicon-bonded fluorine atoms. In general, the redistribution reaction can be driven to completion by using a stoichiometric excess of the hydrocarbyloxy-containing silane, or by removing the more volatile products from the reaction mixtures. If less than complete conversion of silicon-fluorine to silicon-hydrocarbyloxy groups is desired, an equilibrium can be established by the proper choice of reactants and proportions.

The chloromethylated silanes produced in accordance with the instant invention can be hydrolyzed and condensed in the conventional manner, either alone or together with other hydrolyzable silanes, to produce siloxanes containing at least one unit depicted by the formula (4)
$$[ClCH_2-Ar-(R)_n-]_a-Si-O_{\frac{4-(a+b)}{2}}$$
$$\overset{R'_b}{|}$$

wherein Ar, R, R′, n, a and b are as above defined. When the silanes of the instant invention are cohydrolyzed and condensed with other hydrolyzable silanes, the siloxanes produced can also contain at least one unit depicted by the formula (5)
$$R'_m-Si-O_{\frac{4-m}{2}}$$

wherein R′ is a monovalent hydrocarbon radical as defined above with reference to Formula 1, and m is an integer having a value of from 1 to 3. Such siloxane units are produced by the hydrolysis of silanes of the formula (6)    $R'_m-Si-X_{4-m}$ wherein R′ and m are as above defined, and X is halogen or OR′.

Thus, the chloromethylated silanes of the instant invention can be employed to prepare siloxanes composed of units of the structure depicted by Formula 4, or siloxanes composed of one or more units depicted by Formula 4 and one or more units depicted by Formula 5. A small amount of hydrolyzable groups which have not been hydrolyzed can also be present in such siloxanes. When the siloxane is composed of units of Formula 4 and units of Formula 5, the siloxane can contain from 5 mole percent to 95 mole percent of each unit.

If desired, silanes of Formula 2 can be hydrolyzed and condensed either alone, or together with silane of Formula 6, to produce siloxanes which can then be chloromethylated by treating the siloxane with chloromethyl methyl ether, optionally in the presence of a catalytic amount of zinc chloride. The proportions of ingredients and reaction conditions employed in effecting chloromethylation of fluorosilanes can also be employed when a siloxane is to be chloromethylated.

The siloxanes prepared from the silanes of the instant invention are useful in conventional siloxane applications, including uses as lubricants, hydraulic fluids, coating resins for metals and fibers and elastomers.

Example 1

To a 1-liter glass flask equipped with a stirrer, thermometer, reflux condenser, and heating mantle were charged 117 grams (0.5 mole) of betaphenylpropylmethyldichlorosilane, 120 grams (1.5 moles) of chloromethyl methyl ether, 119 grams (1 mole) of thionyl chloride, 3 grams (4.4 mole percent based on the phenyl content of the silane employed) of zinc chloride, and 5 grams of triphenyl phosphine. The mixture was refluxed with continuous stirring at a temperature of 70° C. to 78° C. for 3.5 hours until no more gas evolved from the system. At the end of this time, the mixture was cooled to room temperature, the light product-containing layer was decanted from the denser zinc chloride-containing layer, and the light layer was filtered through milled sodium chloride, stripped of volatiles, and distilled through a one foot Vigreux column to give 90 grams (0.32 mole) of beta - (chloromethylphenyl)propylmethyldichlorosilane. The product had a boiling point of 120° C. at 1.0 mm. Hg pressure and 125° C. at 1.3 mm. Hg pressure, an index of refraction of 1.5286 at 25° C., and a neutralization equivalent of 140.8 (theoretical=140.4).

Example 2

To a 1-liter glass flask equipped with a stirrer, thermometer, reflux condenser, and heating mantle were charged 113.8 grams (0.5 mole) of neophyltrichlorosilane, 120 grams (1.5 moles) of chloromethyl methyl ether, and 82 grams (0.75 mole) of thionyl chloride. The mixture was refluxed with continuous stirring for 40 minutes. At the end of this time, 3.4 grams (5 mole percent based on the phenyl content of the silane employed) of zinc chloride were added to increase the rate of reaction. The mixture was then refluxed for an additional 30 minutes and then allowed to stand at room temperature for 3 hours. Thereafter, the mixture was decanted to separate the light product-containing layer from the denser zinc chloride-containing layer, and the light layer was filtered through milled sodium chloride, stripped of volatiles, and distilled through a one foot Vigreux column to give 102 grams (0.32 mole) of chloromethylneophyltrichlorosilane, $$[ClCH_2\phi C(CH_3)_2CH_2SiCl_3]$$

The product had a boiling point of 109° C. at 0.20 mm. Hg pressure and 115° C. at 0.25 mm. Hg pressure, an index of refraction of 1.5342 at 25° C., and a neutralization equivalent of 107.0 (theoretical=105.3).

Example 3

To a 3-liter glass flask equipped with a stirrer, thermometer, reflux condenser, and heating mantle were charged 760.8 grams (3.0 moles) of beta-phenylpropyltrichlorosilane, 1200 grams (15 moles) of chloromethyl methyl ether, and 357 grams (3 moles) of thionyl chloride. The mixture was refluxed with continuous stirring at a temperature of 70±2° C. for 3 hours until no more gas evolved from the system, and then distilled. The product recovered by distillation was refluxed with an additional 100 grams of thionyl chloride for 3 hours. Distillation of the mixture gave a 66 mole percent yield of beta-(chloromethylphenyl)propyltrichlorosilane. The product had a boiling point of 123° C. at 0.6 mm. Hg pressure, and an index of refraction of 1.5319 at 25° C.

*Analysis.*—Calculated for $C_{10}H_{12}SiCl_4$: C, 39.8%; H, 4.0%; Cl, 46.9%; Si, 9.3%. Found: C, 40.6%; H, 4.5%; Cl, 45.8%; Si, 9.2%.

Example 4

A mixture of 73 grams (0.33 mole) of neophyltrifluorosilane, 132 grams (1.65 moles) of chloromethyl methyl ether, and 9.5 grams (21 mole percent based on the phenyl content of the silane employed) of zinc chloride was refluxed with continuous stirring at a temperature of 60° C. for 45 minutes. At the end of this time, the mixture was cooled to room temperature, the light product-containing layer was decanted from the denser zinc chloride-containing layer, and the light layer was washed with a 5% aqueous solution of HF, dried over anhydrous calcium sulfate, and distilled through a one foot Vigreux column to give a 60 mole per cent yield of chloromethylneophyltrifluorosilane. The product had a boiling point of 70° C. at 0.03 mm. Hg pressure, an index of refraction of 1.4768 at 25° C., and a neutralization equivalent of 88.9
(theoretical=90.0)

*Analysis.*—Calculated for $C_{11}H_{14}SiF_3Cl$: C, 49.5%; H, 5.3%; Si, 10.5%; Cl, 13.3%. Found: C, 49.8%; H, 4.6%; Si, 9.2%; Cl, 13.6%.

Example 5

To a 5-liter glass flask equipped with a stirrer, thermometer, reflux condenser, and heating mantle were charged 700 grams (3.4 moles) of beta-phenylpropyltrifluorosilane, 1368 grams (17 moles) of chloromethyl methyl ether, and 46 grams (10 mole percent based on the phenyl content of the silane employed) of zinc chloride. The mixture was gently refluxed with continuous stirring for 3 hours. At the end of this time, the mixture was stripped of volatiles below 25° C., the light product-containing layer was separated from the denser zinc chloride-containing layer, and the light layer was washed with four 500-milliliter portions of a 10% aqueous solution of HF, dried over anhydrous calcium sulfate, and distilled to give 585 grams (2.31 moles) of beta-chloromethylphenyl)propyltrifluorosilane. The product was purified by fractional distillation through a one foot column packed with ¼" glass helices. The product had a boiling point of 122° C. at 12.0 mm. Hg pressure, and an index of refraction of 1.4716 at 25° C.

*Analysis.*—Calculated for $C_{10}H_{12}SiClF_3$: C, 47.5%; H, 4.79%; Si, 11.1%; Cl, 14.0%; F, 22.6%. Found: C, 47.5%; H, 4.8%; Si, 10.7%; Cl, 14.1%; H, 20.8%.

Example 6

To a 3-liter glass flask equipped with a stirrer, thermometer, reflux condenser, and heating mantle were charged 542 grams (2.85 moles) of beta-phenylethyltrifluorosilane, 684 grams (8.55 moles) of chloromethyl methyl ether, and 38.8 grams (10 mole percent based on the phenyl content of the silane employed) of zinc chloride. The mixture was heated at $45\pm10°$ C. for 21 hours with continuous stirring. At the end of this time, the mixture was cooled, stripped of volatiles below 25° C., the light product-containing layer was separated from the denser zinc chloride-containing layer, and the light layer was washed three times with a total of one liter of an 8% aqueous solution of HF, dried over anhydrous sodium sulfate, and flash distilled through a one foot Vigreux column to give a 41 mole percent yield of beta-(chloromethylphenyl)ethyltrifluorosilane. The product was purified by fractional distillation through a one foot column packed with ¼" glass helices. The product had a boiling point of 118° C. at 13.0 mm. Hg pressure, and an index of refraction of 1.4718 at 25° C.

*Analysis.*—Calculated for $C_9H_{10}SiClF_3$: C, 45.3%; H, 4.5%; Si, 11.8%; Cl, 14.9%; F, 23.9%. Found: C, 45.3%; H, 4.2%; Si, 10.4%; Cl, 14.1%; F, 23.7%.

Example 7

To a 3-liter glass flask equipped with a stirrer, thermometer, reflux condenser, and heating mantle were charged 1001.5 grams (5 moles) of beta-phenylpropylmethyldifluorosilane, 1207 grams (15 moles) of chloromethyl methyl ether, and 50 grams (7.4 mole percent based on the phenyl content of the silane employed) of zinc chloride. The mixture was stirred at room temperature for 20 hours, stripped of volatiles below 25° C., poured into one liter of a 15% aqueous solution of HF, washed three times with 300-milliliter portions of a 15% aqueous solution of HF, dried over anhydrous sodium sulfate, and flash distilled to give a 44 mole percent yield of beta - (chloromethylphenyl)propylmethyldifluorosilane. The product was purified by fractional distillation through a one foot column packed with ¼" glass helices. The product had a boiling point of 143.5° C. at 14.5 mm. Hg pressure and an index of refraction of 1.4870 at 25° C.

*Analysis.*—Calculated for $C_{11}H_{15}SiClF_2$: C, 53.1%; H, 6.1%; Si, 11.3%; Cl, 14.3%; F, 15.3%. Found: C, 53.2%; H, 5.9%; Si, 13.2%; Cl, 13.2%; F, 14.5%.

Example 8

To a 500-milliliter glass flask equipped with a stirrer, thermometer, reflux condenser, and heating mantle were charged 56 grams (0.3 mole) of beta-phenylethylmethyldifluorosilane, 120 grams (1.5 moles) of chloromethyl methyl ether, and 10 grams (24 mole percent based on the phenyl content of the silane employed) of zinc chloride. The mixture was stirred for 10 minutes while the temperature rose to 30° C. The mixture was then refluxed with continuous stirring for 1¼ hours. At the end of this time, the mixture was cooled, the light product-containing layer was separated from the denser zinc chloride-containing layer, and the light layer was washed three times with 200-milliliter portions of a 5% aqueous solution of HF, dried over calcium sulfate, filtered, and distilled to give 41 grams (0.174 mole) of beta-(chloromethylphenyl)ethylmethyldifluorosilane. The product had a boiling point of 73° C. at 0.025 mm. Hg pressure, and 88° C. at 0.100 mm. Hg pressure, and an index of refraction of 1.4882 at 25° C.

Example 9

To a 500-milliliter glass flask equipped with a stirrer, thermometer, reflux condenser, and heating mantle were charged 42.8 grams (0.1 mole) of a polysiloxane having the formula $[\phi C(CH_3)_2CH_2CH_2SiMeO][Me_2SiO]_3$, 40 grams (0.5 mole) of chloromethyl methyl ether, and 0.13 gram (0.8 mole percent based on the phenyl content of the polysiloxane) of zinc chloride. The mixture was refluxed with continuous stirring for 2 hours at a temperature of 65° C. At the end of this time, the mixture was cooled, and the cooled mixture was washed with water until the wash water was neutral. Diethyl ether was then added and the resulting mixture was dried over anhydrous calcium sulfate, stripped of volatiles under vacuum, and distilled through a one foot Vigreux column to give a 59 mole percent yield of a chloromethylated polysiloxane having the formula

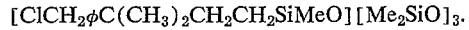

$[ClCH_2\phi C(CH_3)_2CH_2CH_2SiMeO][Me_2SiO]_3$.

The product was purified by fractional distillation through a one foot column packed with ¼" glass helices. The product had a boiling point of 148–149° C. at 0.5 mm. Hg pressure, and an index of refraction of 1.4686 at 25° C.

*Analysis.*—Calculated for $C_{19}H_{37}Si_4O_4Cl$: C, 47.8%; H, 7.8%; Si, 23.5%; Cl, 7.4%. Found: C, 48.3%; H, 8.2%; Si, 23.6% Cl, 7.4%.

Example 10

To a 2-liter glass flask equipped with a drain cock, stirrer, thermometer, reflux condenser, and heating mantle were charged 386 grams (0.27 mole) of a methylsiloxane modified with silicon-bonded beta-phenylpropyl groups, 386 grams (5 molar equivalents based on the phenyl content of the siloxane) of chloromethyl methyl ether, and 2.6 grams (2 mole percent based on the phenyl content of the siloxane) of zinc chloride. The methylsiloxane employed had an index of refraction of 1.4588 at 25° C. and a viscosity of 118 centipoises at 25° C.

The mixture was refluxed with continuous stirring for 3 hours. At half hour intervals, 200 milliliter aliquots were withdrawn until a total of four had been removed. Each aliquot was stripped of volatiles below 25° C., washed with water, diluted with 100 milliliters of isopropyl ether, neutralized with sodium bicarbonate, dried, and filtered. A series of four clear oils were obtained which had been chloromethylated in various degrees.

Example 11

To a 1-liter glass flask equipped with a stirrer, thermometer, reflux condenser, gas inlet tube, dropping funnel, and heating mantle were charged 169 grams (0.56 mole) of beta-chloromethylphenyl)propyltrichlorosilane and 169 milliliters of n-hexane. The mixture was stirred over a period of 38 minutes while 81.1 grams (1.68 moles) of ethanol were added. The resulting mixture was then refluxed with continuous stirring for 70 minutes. At the end of this time, the mixture was cooled, purged with nitrogen to remove undissolved HCl, stripped of volatiles under reduced pressure, and distilled through a one foot Vigreux column to give a product containing about 1.6 percent chlorine. This product was treated with 5 additional milliliters of ethanol and 4 grams of triethylamine (to effect neutralization) in 200 milliliters of hexane, and the mixture was fractionated through a one foot column packed with ¼" glass helices to give beta-(chloromethylphenyl)propyltriethoxysilane in excellent overall yield. The product had a boiling point of 108° C. at 0.26 mm. Hg pressure, and 109° C. at 0.20 mm. Hg pressure, and an index of refraction of 1.4795–1.4808 at 25° C.

*Analysis*—Calculated for $C_{16}H_{27}SiO_3Cl$: C, 58.1%; H, 8.2%; Si, 8.5%; Cl, 10.7%. Found: C, 58.2%; H, 8.5%; Si, 8.4% Cl, 10.7%.

The infrared spectra of the product indicated the para isomer prodominated.

When an equivalent amount of methanol (1.68 moles) was employed in place of ethanol in a manner similar to that described above, an 80 mole percent yield of beta-chloromethylphenyl)propyltrimethoxysilane was obtained. The product had a boiling point of 127–131° C. at 0.5 mm. Hg pressure, and index of refraction of 1.4951 at 25° C.

*Analysis.*—Calculated for $C_{13}H_{21}SiO_3Cl$: C, 54.1%; H, 7.3%; Si, 9.7%; Cl, 12.3%; OMe, 32.2%. Found: C, 54.4%; H, 7.9%; Si, 9.4%; Cl, 13.3%; OMe, 31.2%.

Example 12

To a 1-liter distillation flask fitted to a Vigreux condenser with heating mantle and thermometer was charged 242 grams (1.01 mole) of beta-(chloromethylphenyl)ethyltrifluorosilane, 150 grams of tetraethylsilicate (0.72 mole), 178 grams of methyltriethoxysilane (1.0 mole), and 5.4 grams of tetrabutyltitanate. The mixture was heated and a rapid reaction began at about 75° C. Heating was continued for 18 hours during which time the reaction mixture reached a temperature of 228° C. and volatiles boiling above about 160° C. were removed from the system. Following this, the mixture was stripped under vacuum, distilled, and redistilled to give a 58 mole percent yield of beta-(chloromethylphenyl)ethyltriethoxysilane. The product had a boiling point of 112–113° C. at 0.005 mm. Hg pressure, and an index of refraction of 1.4802 at 25° C.

*Analysis.*—Calculated for $C_{15}H_{25}SiO_3Cl$: C, 56.8%; H, 8.0%; Si, 8.9%; Cl, 11.2%; OEt, 42.7%. Found: C, 57.0%; H, 8.0%; Si, 8.9%; Cl, 10.3%; OEt, 42.1%.

Example 13

To a 1-liter flask fitted to a Vigreux condenser with heating mantle and thermometer were charged 120 grams (0.48 mole) of beta-(chloromethylphenyl)propylmethyldifluorosilane, 89 grams (0.5 mole) of methyltriethoxysilane and 2 grams of tetrabutyltitanate. The mixture was heated and at about 100° C. its color changed from yellow to colorless as reaction began. Heating was continued for 90 minutes during which time the reaction mixture reached a temperature of 230° C. and volatiles boiling above about 110° C. were removed from the system. Following this, the mixture was cooled and distilled. A product having a residual fluorine content of about 2 percent was obtained. This product was refluxed with an additional 18 grams (0.1 mole) of methyltriethoxysilane and 2 grams of tetrabutyltitanate for one hour as described above to remove volatiles boiling above about 120° C. The mixture was then distilled to give an 85 mole percent yield of beta-(chloromethylphenyl)propylmethyldiethoxysilane. The product had a boiling point of 110° C. at 0.035 mm. Hg pressure, and an index of refraction of 1.4900 at 25° C.

*Analysis.*—Calculated for $C_{15}H_{25}SiO_2Cl$: C, 59.9%; H, 8.4%; Si, 9.3%; Cl, 11.8%; OEt, 30.0%. Found: C, 59.1%; H, 8.5%; Si, 9.1%; Cl, 11.2%; OEt, 28.2%.

Example 14

To a 600-milliliter beaker were charged 24 grams of beta-(chloromethylphenyl)propyltrimethoxysilane, 50 milliliters of diethyl ether, and 100 milliliters of water. The mixture was stirred overnight and a white resinous precipitate was obtained. The precipitate was dissolved in toluene and residual water was removed therefrom by azeotropic distillation. A polysiloxane, $$[ClH_2\phi C(CH_3)HCH_2SiO_{3/2}]_x$$

was obtained in quantitative yield.

*Analysis.*—Calculated for $C_{10}H_{12}SiO_3Cl$: C, 54.7%; H, 5.5%; Cl, 16.1%; Si, 12.8%. Found: C, 55.9%; H, 5.6%; Cl, 14.3%; Si, 11.4%.

Example 15

To a 3-liter glass flask equipped with a stirrer, thermometer, dropping funnel, and reflux condenser were charged 53 grams (1.88 moles) of beta-(chloromethylphenyl)propylmethyldichlorosilane and 810 grams (7.5 moles) of trimethylchlorosilane. The mixture was stirred over a period of 45 minutes while 672 grams (11.2 moles) of isopropyl alcohol were added. The mixture was then stirred for an additional 15 minutes and 202 grams (11.2 moles) of water were added while stirring was continued over another 15 minute period. After the addition of water was complete, stirring was continued for 24 hours. At the end of this time, the mixture was diluted with 250 milliliters of hexane and 6 liters of water. The organic layer was washed with water until the wash water was neutral, dried, and distilled under atmospheric pressure to remove solvent therefrom. The residue was then distilled under vacuum to give 366 grams of a polysiloxane of the formula

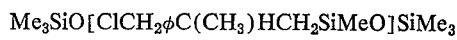

(boiling point=103° C. at 0.2 mm. Hg pressure, index of refraction=1.4666 at 25° C.), and 221 grams of a polysiloxane of formula

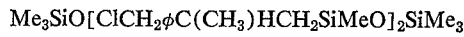

(boiling point=223±2° C. at 0.3 mm. Hg pressure, index of refraction=1.4969 at 25° C.).

*Analysis.*—Calculated for $C_{17}H_{33}Si_3O_2Cl$: C, 52.5%; H, 8.5%; Si, 21.7%; Cl, 9.1%. Found: C, 51.0%; H, 8.5%; Si, 22.4%; Cl, 9.5%.

Calculated for $C_{28}H_{48}Si_4O_3Cl_2$: C, 54.6%; H, 7.9%; Si, 18.2%; Cl, 11.5%. Found: C, 54.3%; H, 8.0%; Si, 17.8%; Cl, 11.7%.

What is claimed is:

1. Silanes represented by the formula

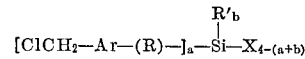

wherein Ar is an arylene radical, R is an alkylene radical, R' is a monovalent hydrocarbon radical, X is a radical selected from the group consisting of halogen and OR' wherein R' is as defined above, $a$ is an integer having a value of from 1 to 3, $b$ is an integer having a value of from 0 to 2, provided, however, that the sum of $a+b$ does not exceed 3, except when X is chlorine, in which case it does not exceed 2.

2. Silanes as in claim 1 wherein X is fluorine.
3. Silanes as in claim 1 wherein X is chlorine.
4. Silanes as in claim 1 wherein Ar is an arylene radical having from 6 to 18 carbon atoms, R is an alkylene radical having from 1 to 12 carbon atoms, R' is a monovalent hydrocarbon radical having from 1 to 18 carbon atoms, $a$ is an integer having a value of 1, and the sum of $a+b$ does not exceed 2.
5. Silanes as in claim 4 wherein X is fluorine.
6. Silanes as in claim 4 wherein X is chlorine.
7. Silanes as in claim 1 wherein Ar is phenylene, R is an alkylene radical having from 1 to 8 carbon atoms, R' is an alkyl radical having from 1 to 8 carbon atoms, $a$ is an integer having a value of 1, and the sum of $a+b$ does not exceed 2.
8. Silanes as in claim 7 wherein X is fluorine.
9. Silanes as in claim 7 wherein X is chlorine.
10. Beta - (chloromethylphenyl)propylmethyldichlorosilane.
11. Chloromethylneophyltrichlorosilane.
12. Beta-(chloromethylphenyl)propyltrichlorosilane.
13. Chloromethylneophyltrifluorosilane.
14. Beta-(chloromethylphenyl)propyltrifluorosilane.
15. Beta-(chloromethylphenyl)ethyltrifluorosilane.
16. Beta - (chloromethylphenyl)propylmethyldifluorosilane.

17. Beta-(chloromethylphenyl)ethylmethyldifluorosilane.
18. Beta-(chloromethylphenyl)propyltriethoxysilane.
19. Beta-(chloromethylphenyl)propyltrimethoxysilane.
20. Beta-(chloromethylphenyl)ethyltriethoxysilane.
21. Beta-(chloromethylphenyl)propylmethyldiethoxysilane.
22. A process for producing silanes represented by the formula

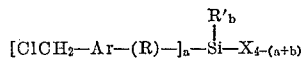

wherein Ar is an arylene radical, R is an alkylene radical, R' is a monovalent hydrocarbon radical, X is a radical selected from the group consisting of halogen and OR" wherein R" is an alkyl radical, $a$ is an integer having a value of from 1 to 3, $b$ is an integer having a value of from 0 to 2, provided, however, that the sum of $a+b$ does not exceed 3, which comprises reacting a mixture of chloromethyl methyl ether, thionyl chloride when X is other than fluorine, and a silane represented by the formula

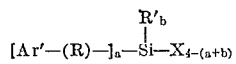

wherein R, R', X, $a$, and $b$ are as defined above, and Ar' is a monovalent aryl radical corresponding to arylene radical Ar as defined above except that one of the valencies of the arylene radical is satisfied by hydrogen.

23. A process as in claim 22 wherein the reaction mixture contains a catalytic amount of zinc chloride.
24. A process as in claim 22 wherein Ar is phenylene, R is an alkylene radical having from 1 to 8 carbon atoms, R' is an alkyl radical having from 1 to 8 carbon atoms, and X is fluorine.
25. A process as in claim 22 wherein Ar is phenylene, R is an alkylene radical having from 1 to 8 carbon atoms, R' is an alkyl radical having from 1 to 8 carbon atoms, and X is chlorine.
26. A process as in claim 24 wherein the reaction mixture contains a catalytic amount of zinc chloride.
27. A process as in claim 25 wherein the reaction mixture contains a catalytic amount of zinc chloride.
28. A siloxane consisting essentially of (a) from 5 mole percent to 95 mole percent of units represented by the formula

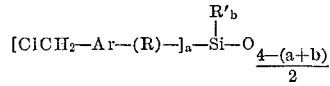

wherein Ar is an arylene radical, R in an alkylene radical, R' is a monovalent hydrocarbon radical, $a$ is an integer having a value of from 1 to 3, $b$ is an integer having a value of from 0 to 2, provided, however, that the sum of $a+b$ does not exceed 3, and (b) from 5 mole percent to 95 mole percent of units represented by the formula

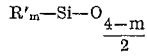

wherein R' is as defined above, and m is an integer having a value of from 1 to 3.

29. A siloxane as in claim 28 wherein Ar is an arylene radical having from 6 to 18 carbon atoms, R is an alkylene radical having from 1 to 12 carbon atoms, and R' is a monovalent hydrocarbon radical having from 1 to 18 carbon atoms.
30. A siloxane as in claim 28 wherein Ar is phenylene, R is an alkylene radical having from 1 to 8 carbon atoms, R' is an alkyl radical having from 1 to 8 carbon atoms.

References Cited
UNITED STATES PATENTS 2,832,794   4/1958   Gordon _____ 260—448.8 XR

OTHER REFERENCES

Fuson, "Advanced Organic Chemistry," John Wiley & Sons, Inc., New York (1950), p. 321.

TOBIAS E. LEVOW, *Primary Examiner.*

P. F. SHAVER, *Assistant Examiner.*